(12) United States Patent
Yamaguchi et al.

(10) Patent No.: US 6,701,164 B1
(45) Date of Patent: Mar. 2, 2004

(54) MOBILE COMMUNICATION SYSTEM WITH ZONE-SHIFT CONTROL APPARATUS

(75) Inventors: Akira Yamaguchi, Tokyo (JP); Yoshio Takeuchi, Saitama (JP); Fumio Watanabe, Saitama (JP)

(73) Assignee: KDD Corporation, Tokyo (JP)

( * ) Notice: Subject to any disclaimer, the term of this patent is extended or adjusted under 35 U.S.C. 154(b) by 322 days.

(21) Appl. No.: 09/597,616

(22) Filed: Jun. 20, 2000

(30) Foreign Application Priority Data

Jun. 21, 1999 (JP) ............................................ 11/174155
Sep. 29, 1999 (JP) ............................................ 11/276210

(51) Int. Cl.[7] ................................................. H04B 1/28
(52) U.S. Cl. .................................... 455/562.1; 455/446
(58) Field of Search .......................... 455/562.1, 446, 455/453, 432, 433, 434, 435, 440, 442, 444, 517, 422, 456, 276.1, 277.1, 277.2, 279.1, 441, 40; 342/354, 367, 371, 373

(56) References Cited

U.S. PATENT DOCUMENTS

| | | | | |
|---|---|---|---|---|
| 5,815,116 A | * | 9/1998 | Dunbridge et al. | 342/373 |
| 5,878,327 A | * | 3/1999 | Hayashi et al. | 455/41 |
| 5,890,067 A | * | 3/1999 | Chang et al. | 455/446 |
| 6,259,919 B1 | * | 7/2001 | Suonvieri et al. | 455/441 |
| 6,330,459 B1 | * | 12/2001 | Crichton et al. | 455/562 |

* cited by examiner

*Primary Examiner*—Quochien B. Vuong
*Assistant Examiner*—Simon Nguyen
(74) *Attorney, Agent, or Firm*—Armstrong, Kratz, Quintos, Hanson & Brooks, LLP.

(57) ABSTRACT

A mobile communication system includes a plurality of antennas for sending and receiving beams, a plurality of mobile terminals moving in a fixed direction substantially, and a zone-shift control unit for treating the moving mobile terminals locating within a predetermined area as a single moving zone and for controlling the antennas and directions of the beams so that the beams always cover the moving zone.

9 Claims, 9 Drawing Sheets

| FREQUENCY RESOUCE | ANT 1 | ANT 2 | ANT 3 | ANT 4 | ANT 5 | ANT 6 |
|---|---|---|---|---|---|---|
| 2 | F1 | F1 | F1 | F1 | F1 | F1 |
|   | F2 | F2 | F2 | F2 | F2 | F2 |
| 4 | F3 | F3 | F3 | F3 | F3 | F3 |
|   | F4 | F4 | F4 | F4 | F4 | F4 |
| 6 | F5 | F5 | F5 | F5 | F5 | F5 |
|   | F6 | F6 | F6 | F6 | F6 | F6 |
| 8 | F7 | F8 | F7 | F8 | F7 | F8 |

Fig. 9

MOBILE COMMUNICATION SYSTEM WITH ZONE-SHIFT CONTROL APPARATUS

FIELD OF THE INVENTION

The present invention relates to a mobile communication system with antennas for sending and receiving a plurality of antenna beams and mobile terminals moving in a fixed direction substantially. In particular, the present invention relates to ITS (Intelligent Transportation System).

DESCRIPTION OF THE RELATED ART

A portable telephone system is one of mobile communication systems with vehicle-mounted telephone terminals. Many cells constitute the service area of this system. Each cell has generally a one-kilometer or more radius, and the deployment of the frequency is repeated for every one-kilometer.

A cordless telephone system typically such as PHS (Personal Handy-phone System) is another mobile communication system. Each cell of this system has in general a radius between several tens of meters and several hundreds of meters, and the deployment of the frequency is repeated for every length shorter than one-kilometer.

However, exchanging units used in these conventional mobile communication systems independently control the switching for every mobile terminal. Therefore, the number of the switching executed in each exchanging unit increases when the number of the mobile terminals in a cell increases. Furthermore, in the conventional mobile communication systems, if a cell size is small and also the mobile terminal moves in high-speed, the handovers may be frequently repeated and thus the PHS for example may fail to catch the mobile terminal.

SUMMARY OF THE INVENTION

It is therefore an object of the present invention to provide a mobile communication system, whereby even if the number of mobile terminals increases, the number of times of switching in an exchanging unit does not increase, under an environment in which mobile terminals move in a fixed direction substantially, for example on a road for vehicles.

According to the present invention, a mobile communication system includes a plurality of antennas for sending and receiving beams, a plurality of mobile terminals moving in a fixed direction substantially, and a zone-shift control unit for treating the moving mobile terminals locating within a predetermined area as a single moving zone and for controlling the antennas and directions of the beams so that the beams always cover the moving zone.

The present invention utilizes moving characteristics of vehicles on a road. Since the switching occurs only per zone, the number of times of the switching in an exchanging unit can be reduced. Handover is performed based on the difference between a speed of the zone and a speed of the mobile terminal, and thus the number of times of the handover can be reduced.

It is preferred that the zone-shift control unit operates to cover the zone by using a plurality of beams containing beams of neighboring antennas. Thus, the smooth movement of the zone becomes possible.

It is preferred that each of the antennas is a movable beam antenna that can smoothly sweep a coverage area of its beam. This is ideal. In the case that such antenna is used, it is also preferred that the zone-shift control unit includes a unit for covering the zone by using a plurality of beam patterns containing beam patterns of neighboring antennas and for switching the beam patterns in accordance with movement of the zone. Each of the beam A patterns for each antenna is formed by combining a plurality of beams. Furthermore, it is preferred that the antennas include at least one antenna that can modify a coverage width of its beam. Thereby, the number of mobile terminals covered by one beam is controllable.

It is preferred that each of the antennas is a fixed beam antenna that cannot move a coverage area of its beam, and that the zone-shift control unit includes a unit for covering the zone by using a plurality of beam patterns containing beam patterns of neighboring antennas and for switching the beam patterns in accordance with movement of the zone, each of the beam patterns for each antenna being formed by combining a plurality of beams. In this case, it is preferred that the zone-shift control unit includes a unit for switching the beam patterns in accordance with traffic distribution of the mobile terminals.

It is preferred that each zone uses a frequency band, and that the zone-shift control unit includes a unit for assigning at least two of the zones to an optional area in an environment. Thereby, it can prevent that the mobile terminal is not covered by a beam when the beam patterns are switched or when the movable beam reached to the end edge of the movable area is returned.

It is preferred that the zone-shift control unit includes a unit for cyclically assigning the zone moved to an outlet of an environment to an inlet of the environment. Since the zone is always controlled even when no mobile terminal exists in the zone, the control will be made easy.

It is preferred that the zone-shift control unit includes a unit for registering the mobile terminal newly entered at an inlet of an environment with an already existing zone or with a newly generated zone depending upon predetermined conditions. The predetermined conditions are that the mobile terminal locates within a coverage area of the already existing zone or that the mobile terminal locates at a position separated from the already existing zone by a fixed distance or less, and that the number of mobile terminals registered in the already existing zone does not exceed a limited number. The zone-shift control unit includes a unit for registering the mobile terminal with the already existing zone if the predetermined conditions are satisfied. Thereby, no zone is generated uselessly. Thus, no unnecessary beam is emitted from the antennas causing interference waves to reduce from occurring.

It is preferred that the zone-shift control unit includes a unit for merging two zones into one zone and for registering the merged zone depending upon first predetermined conditions when one of the two zones approaches the other zone. The first predetermined conditions are that a distance between the two zones is equal to or shorter than a predetermined distance and that a difference between the moving speeds of the two zones is equal to or lower than a predetermined speed. The zone-shift control unit includes a unit for merging the two zones into one zone and for registering the merged zone if the first predetermined conditions are satisfied. Thereby, the zone-shift control is effective not only when all zones move at the same speed, but also when zones move at different speeds, respectively.

It is preferred that the zone-shift control unit includes unit for dividing one zone into a plurality of zones depending upon second predetermined conditions. The second predetermined conditions are that a distance between the mobile terminals is equal to or longer than a specific distance or that the number of mobile terminals registered in the one zone will exceed a limited number. The zone-shift control unit includes a unit for dividing the one zone into a plurality of zones if the second predetermined conditions are satisfied. Thereby, proper zone control can be expected when the road becomes vacant from the congested state. That is, the zone is narrowed at the congested part of the road, whereas enlarged at the vacant part. Thus, the number of mobile terminals in a zone can be controlled so as to avoid the congested status in the zone.

It is preferred that the zone-shift control unit includes a unit for performing handover for a mobile terminal when the mobile terminal belonged to a first zone moves at higher speed than that of the first zone and enters into a second zone. Thus, the conventional handover control method can be used as it is.

It is preferred that each of the zones corresponds to a cell, and that the zone-shift control unit includes a unit used in a cellular telephone or cordless telephone system. Thereby, the present invention is easily applicable to the conventional system.

Further objects and advantages of the present invention will be apparent from the following description of the preferred embodiments of the invention as illustrated in the accompanying drawings.

DESCRIPTION OF THE PREFERRED EMBODIMENTS

Figure 1:
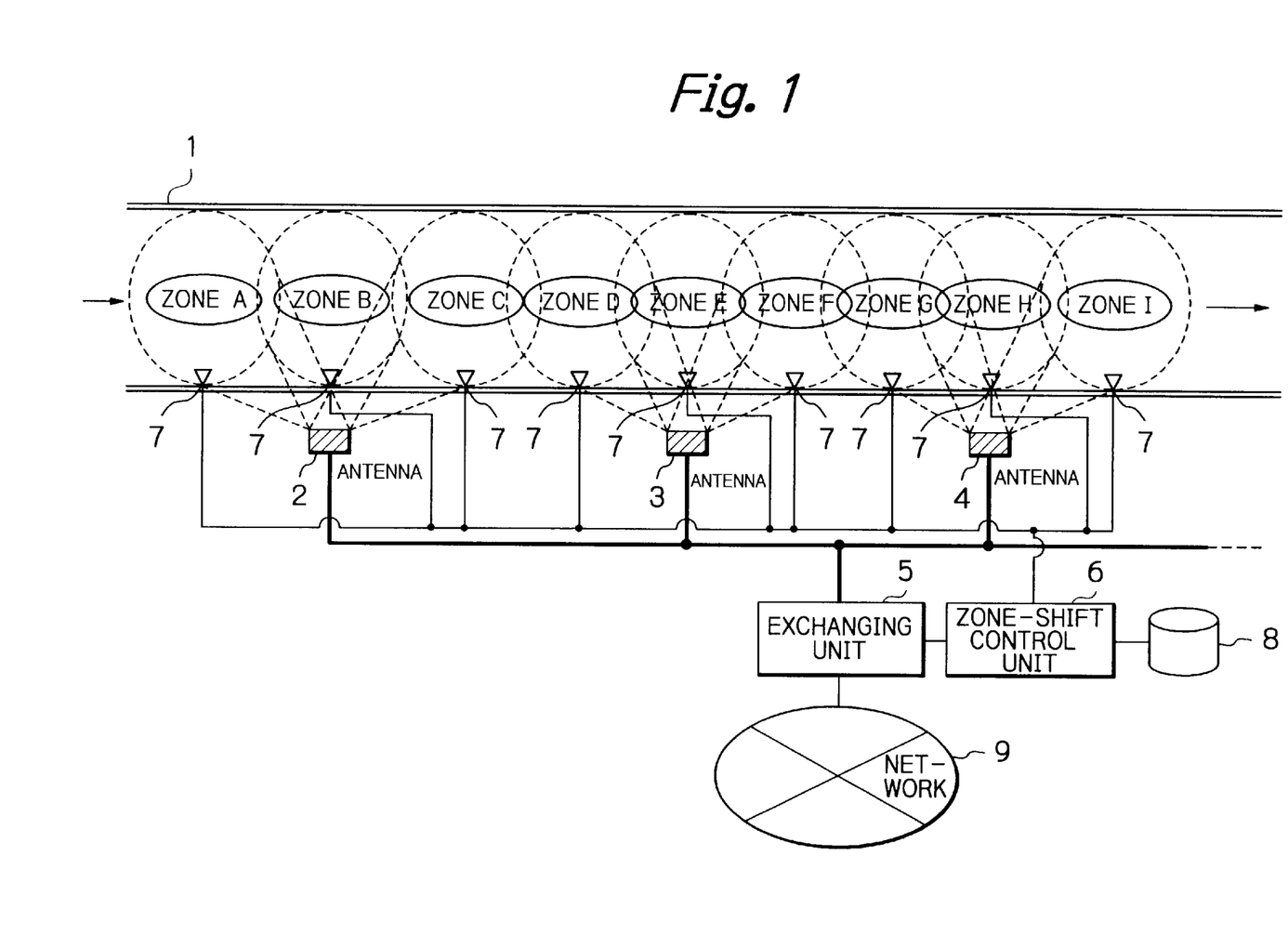
FIG. 1 schematically illustrates of a mobile communication system in a preferred embodiment according to the present invention.

FIG. 1 schematically illustrates of a mobile communication system in a preferred embodiment according to the present invention. In the figure, reference numeral 1 denotes a road that is an example of an environment in which mobile terminals move in a fixed direction substantially. The mobile communication system is provided with antennas 2, 3 and 4, an exchanging unit 5, a zone-shift control unit 6, sensors 7, a database 8, and a network 9.

The antennas 2, 3 and 4 can send and receive a plurality of beams. The exchanging unit 5 exchanges data between the antennas and the network 9. The exchanging unit 5 has modems for respective mobile terminals, and exchanges the data between the antennas and the network 9 through the modems. The control unit 6 provides instructions of switching control to the exchanging unit 5 to switch the antennas and the directions of the antenna beams so that the beams are always applied to the respective zones that are moving. In each moving zone, a plurality of the mobile terminals is existed. The sensors 7 monitor movement of the mobile terminals mounted in vehicles for example and send the detected movement of the mobile terminals to the control unit 6. The database 8 registers and manages the mobile terminals existed in each zone.

Figure 2:
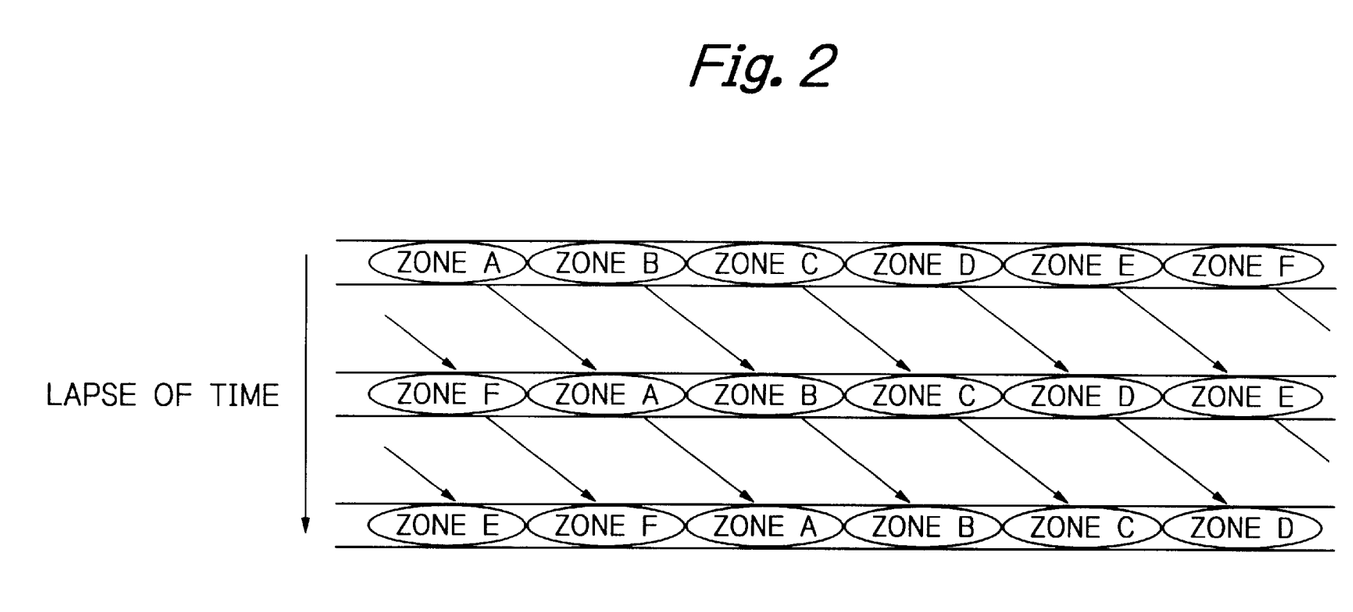
FIG. 2 illustrates movement of zones.

FIG. 2 illustrates movement of the zones. The present invention is applied to an environment in which mobile terminals move in a fixed direction substantially. Therefore, as will be noted from FIG. 2, the zones are a, shifted with a lapse of time or with the movement of the mobile terminals. The control unit 6 controls such that the antennas and their beams are shifted in a one direction depending upon the movement of the zones.

Hereinafter, more specific constitution of the antennas for realizing the zone-shift will be described.

Figure 3:
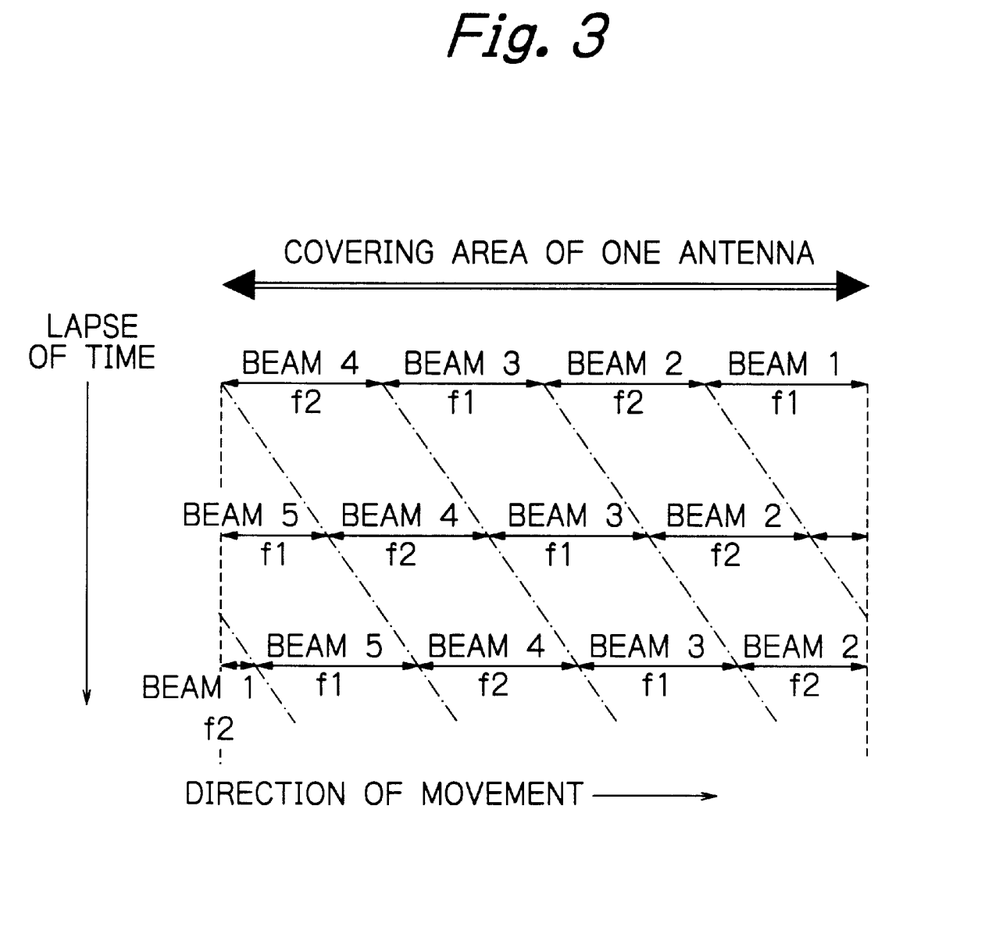
FIG. 3 illustrates movement of beams of an antenna when the antenna can move its beams in the embodiment of FIG. 1 according to the present invention.

FIG. 3 illustrates movement of beams of an antenna when the antenna can move its beams so as to smoothly sweep their coverage areas. This figure indicates four movable beams outputted from the one movable beam antenna. Such the movable beam antenna sweeps these beams in response to the movement of vehicles.

Figure 4:
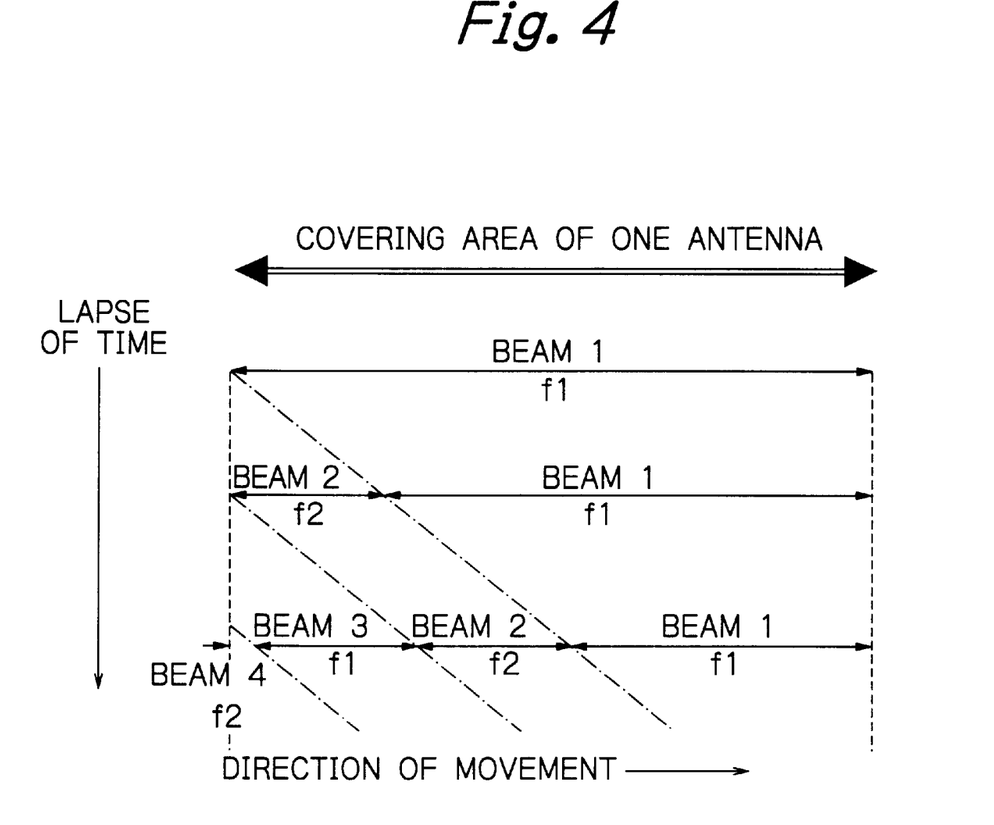
FIG. 4 illustrates movement of the beams shown in FIG. 3 when a road is congested from the state of being vacant.

FIG. 4 illustrates movement of the beams shown in FIG. 3 when a road is congested from the state of being vacant.

As will be noted from the figure, since the coverage width of each beam is adjustable, the number of beams can be controlled in accordance with the vehicle density. Conversely, the number of beams can be efficiently controlled also when the road becomes vacant from the congested state. Therefore, according to the present invention, the number of vehicles covered by one beam can be controlled almost uniformly.

Figure 5:
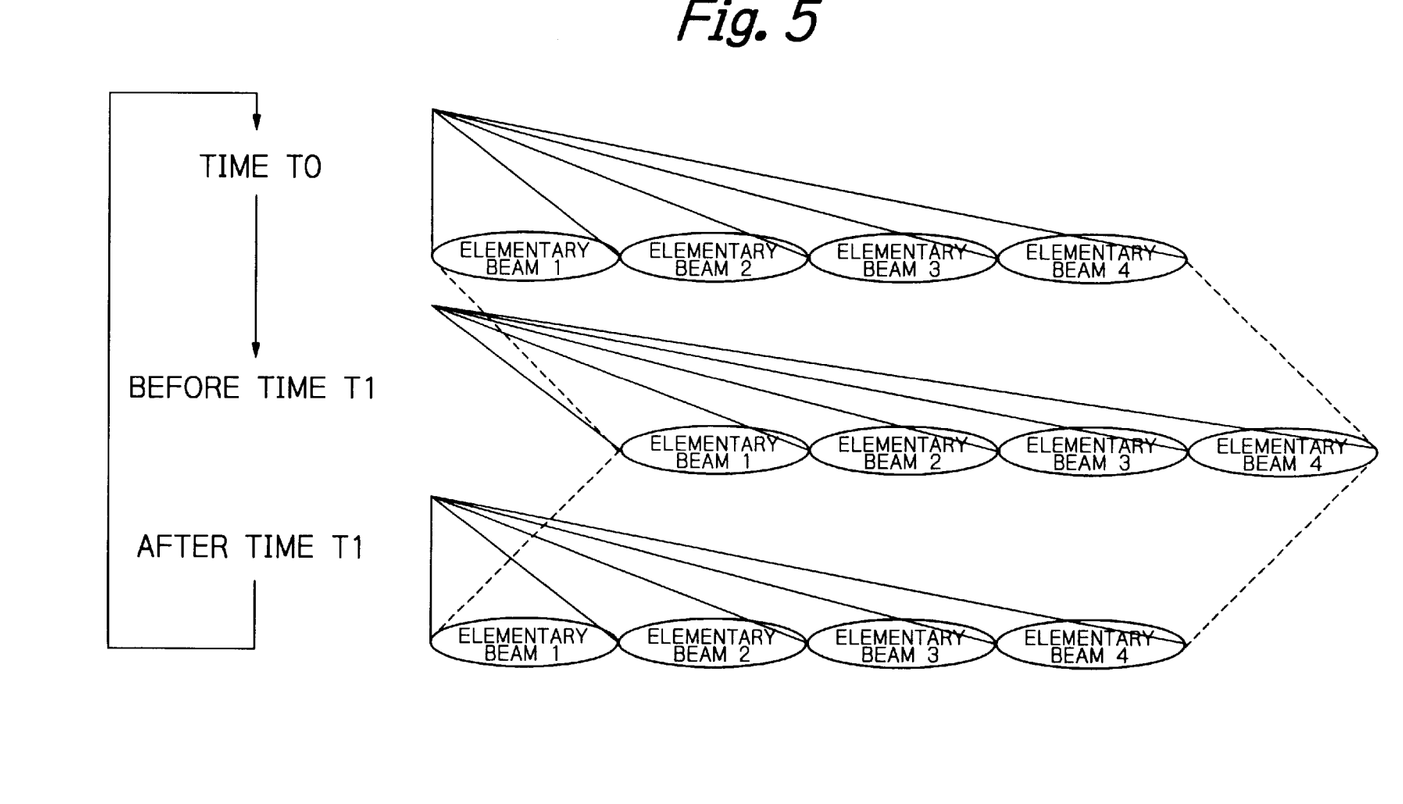
FIG. 5 illustrates movement of a beam of one antenna in the embodiment of FIG. 3.

FIG. 5 illustrates movement of a beam of one antenna in the embodiment of FIG. 3. The antenna sweeps the antenna beam toward a direction of the movement of vehicles with a lapse of time. When the beam arrives at one end of a movable area (time T1), it is immediately returned to the other end of the movable area.

The movable beam antenna that can move its beams is ideal for use in the mobile communication system according to the present invention. However, such movable beam antenna is very expensive now and has a very large size.

The zone-shift function in the mobile communication system according to the present invention may be realized by using antenna each providing beams with a fixed coverage width and a fixed coverage area. Hereinafter, the structure of such fixed coverage beam antenna will be described.

Figure 6:
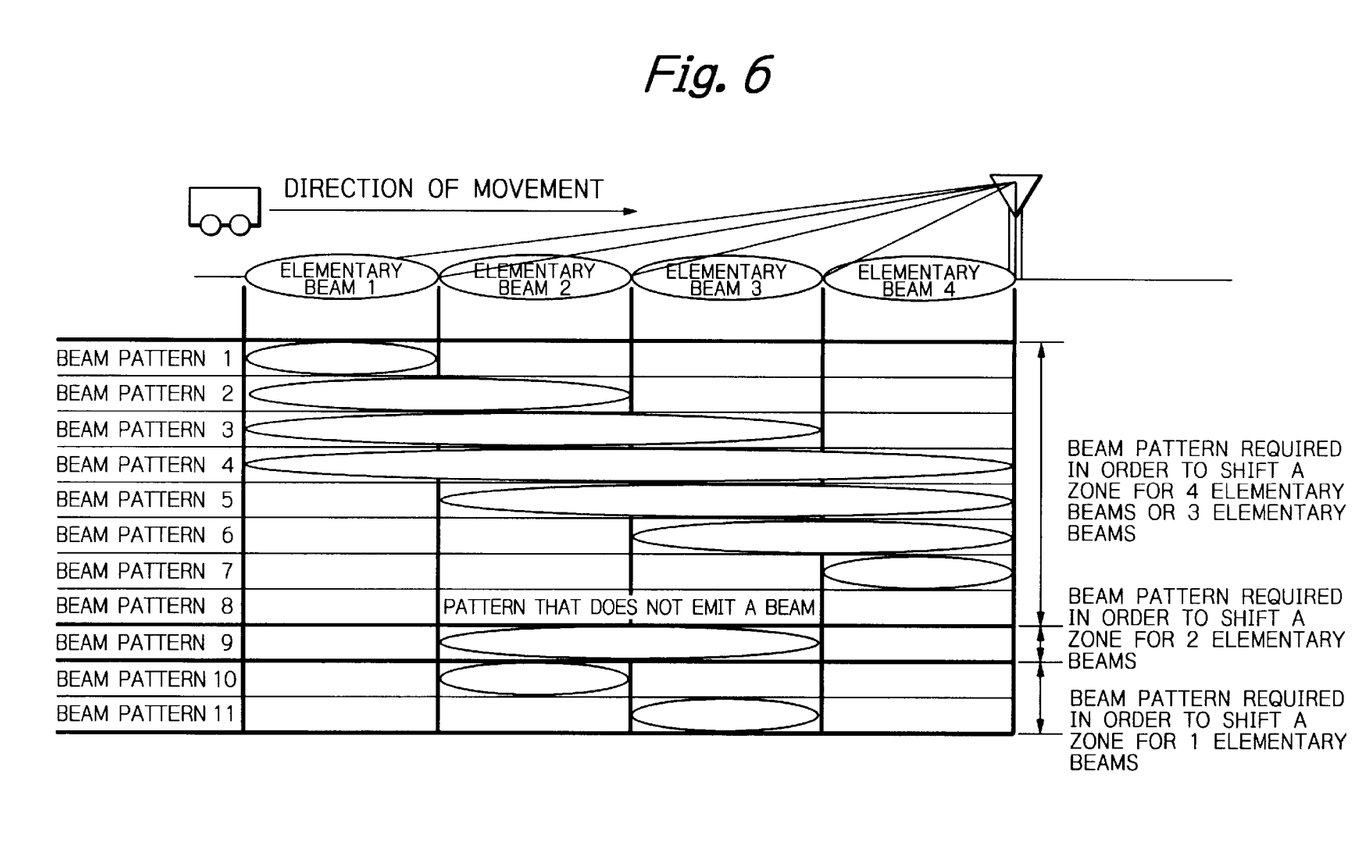
FIG. 6 illustrates beam patterns when each antenna cannot move its beams in another embodiment according to the present invention.

FIG. 6 illustrates beam patterns when each antenna cannot move its beams in another embodiment according to the present invention. Each antenna can emit four elementary beams. Unlike the embodiment of FIG. 3, the coverage width and coverage area of the beam in this embodiment are fixed. As shown in FIG. 6, in this embodiment, beam patterns 1–11 each of which is formed by optionally combining four elementary beams are defined. By switching the beam patterns in the order of 1→2→, ..., →7, the beam can be shifted in response to the moving direction of a vehicle. The beam patterns 8–11 shown in FIG. 6 are used when no vehicle exists in the coverage area or when at least one vehicle suddenly presents itself.

Figure 7:
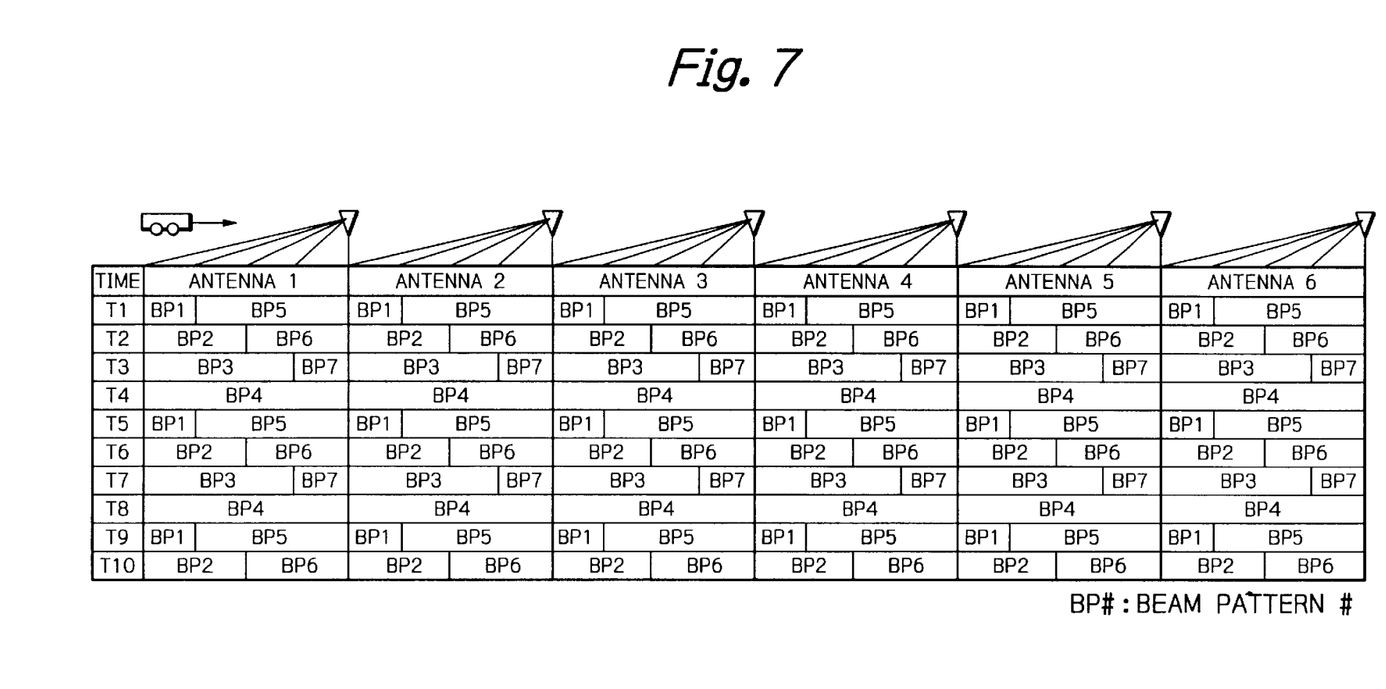
FIG. 7 illustrates change of beam patterns when there is a plurality of the antennas in the embodiment of FIG. 6.

FIG. 7 illustrates change of beam patterns when there is a plurality of the antennas in the embodiment of FIG. 6. In the example of FIG. 7, six antennas each of which emits four elementary beams are mounted for one lane, two frequencies are used, and the same frequency is reused for every four elementary beams. The beam pattern emitted from the antenna 1 is changed in the order of BP1(T1)→BP2(T2)→, . . . , →BP7(T7), with a lapse of time and with the movement of a vehicle group.

Figure 8:
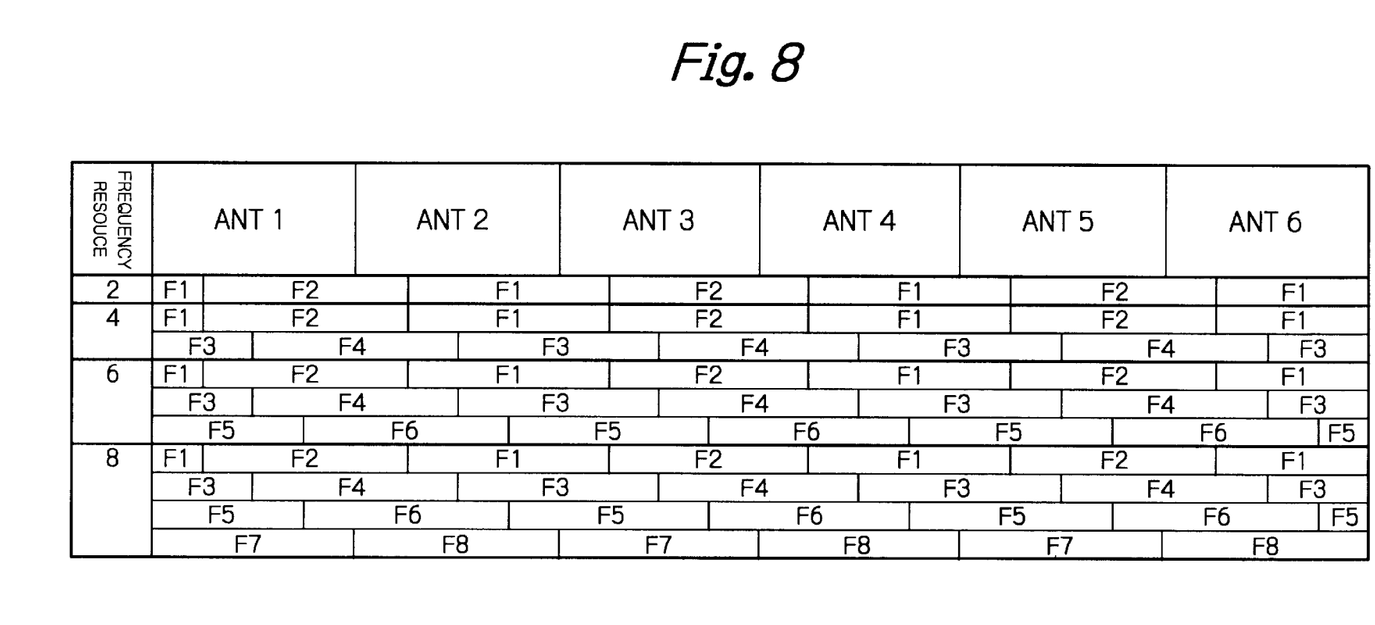
FIG. 8 illustrates movement of the beam patterns shown in FIG. 6 when each antenna can move its beams in a further embodiment according to the present invention.

FIG. 8 illustrates movement of the beam patterns shown in FIG. 6 when each antenna can move its beams in a further embodiment according to the present invention. Thus, this embodiment can provide both effects of the embodiments of FIGS. 5 and 7.

Figure 9:
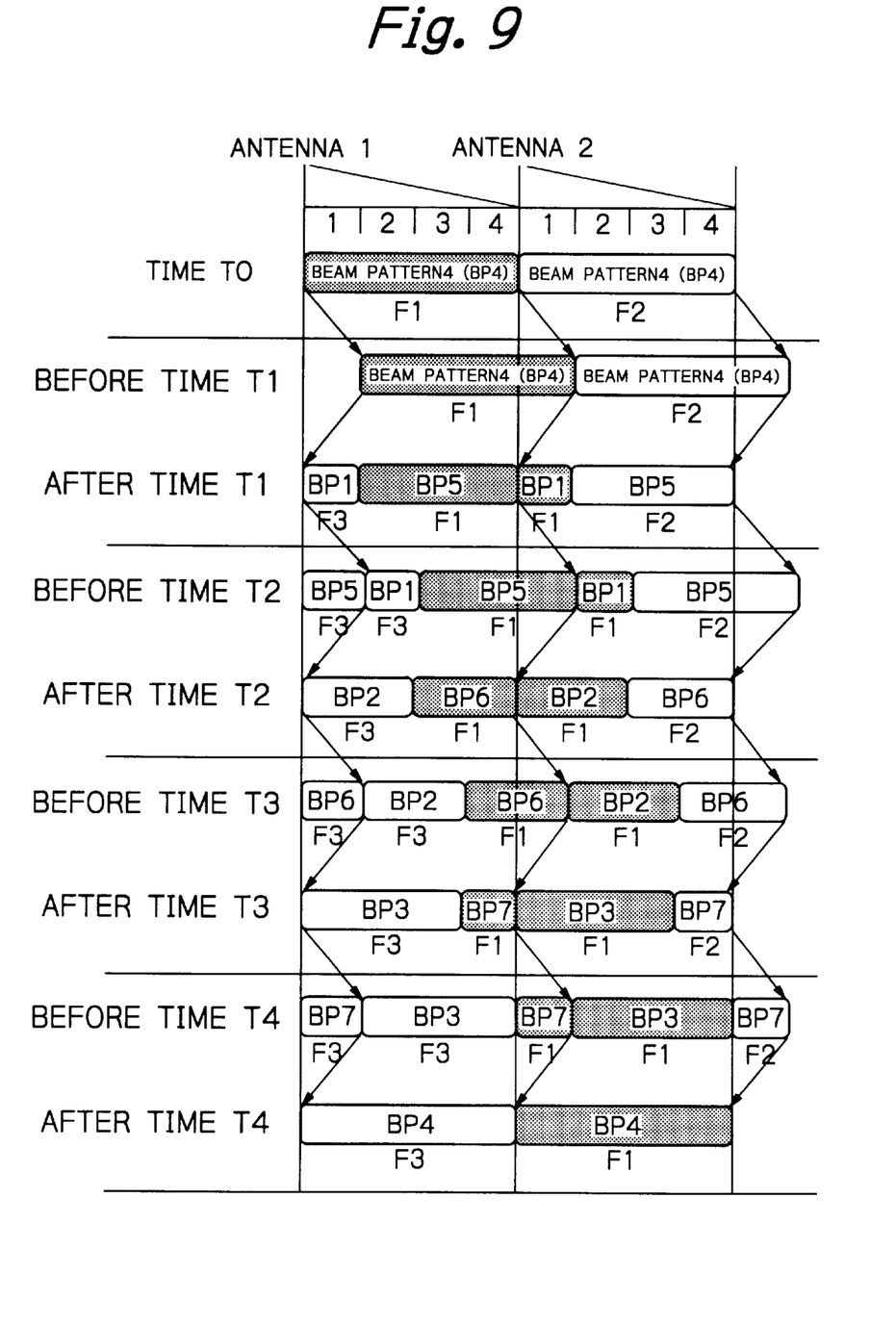
FIG. 9 illustrates overlap of beam patterns shown in FIG. 6 when there are four, six or eight frequency resources in a still further embodiment according to the present invention.

FIG. 9 illustrates overlap of beam patterns shown in FIG. 6 when there are four, six or eight frequency resources in a still further embodiment according to the present invention. This embodiment can prevent failure of catching a vehicle by the beam pattern when the beam patterns are switched. Since the beam patterns are overlapped, even if one beam pattern fails to catch a vehicle due to the switching of the beam patterns, the other beam pattern that is not switched will catch the vehicle. In this case, it is necessary that additional beams be positioned at top and end edge areas of the zone for overlapping the beam patterns so as to provide smooth zone-shift for all the vehicles. If the overlap between the beams is large, the shift of the beam patterns becomes smooth. However, in this case, the number of beams will increase and a frequency utilization factor becomes bad because different frequencies are required for every overlapped beams.

A zone-shift function is available by the above-mentioned antenna structure. Now, movement of a zone in an environment such as a road will be described.

Operation of the zone-shift control unit 6 is as follows.

The control unit 6 allocates any mobile terminal in the road to one of zones and controls the exchanging unit 5 so that the antennas and their beams are switched to follow the movement of the zone. That is, the control unit 6 selects and assigns the modems in the exchanging unit 5 to the zone depending upon the number of the mobile terminals in this zone.

This control unit 6 can cyclically control the movement of the zone in the road so that the zone moved up to the outlet of the road to return to its inlet. Even if no mobile terminal exists in the zone, all the antennas emit their beam toward the respective zones. The control unit 6 switches the antenna beams in the zone to shift in a fixed direction with a lapse of time. The zone arrived at the outlet of the road is returned again to the inlet of the road.

Since each zone with a constant area is moved in cycles, there may be many mobile terminals in one zone but there may be a few mobile terminals in another zone. However, according to the present invention, since the control unit 6 can adjust the area of the zone in accordance with the traffic distribution of the mobile terminals, flexible control of the zone area can be expected.

Other than the aforementioned cyclic zone-movement method, the control unit 6 may execute another method for registering a newly incoming vehicle at the inlet of the road to an already existing zone or to a newly generated zone. According to the latter method, a zone is not generated beyond at necessity. In other words, a useless beam is not emitted from the antenna causing interference waves to reduce from occurring.

When a sensor mounted at a tollgate detects an entry of a mobile terminal, or when a mobile terminal directly communicates by its radio to the control unit, the control unit judges that the mobile terminal is entering into the road. Information of a location and a speed of the mobile terminal and available services will be notified to the control unit. The control unit then searches a possible zone for registry in accordance with the location and the speed of the mobile terminal.

In case that the mobile terminal locates within the coverage of the already existing zone, or in case that the mobile terminal locates below in a fixed distance from the already existing zone, the mobile terminal will be registered to the existing zone when the number of mobile terminals registered in this zone does not exceed a limited number. Otherwise, all of the mobile terminals will be registered into newly generated zones.

Of course, when the sensor mounted at the tollgate detects an exit of a mobile terminal from the outlet of the road, the control unit will cancel the zone registration of this mobile terminal.

According to the above-mentioned method for registering each of newly entering mobile terminals to a zone, if distribution of the mobile terminals fragments, many narrow zones will be registered and thus shortage of the modems in the exchanging unit will occur. Moving speeds of the respective zones may not always be the same but may differ with each other. For example, one mobile terminal may move at higher speed and catches up with another mobile terminal, or mobile terminals may be congested causing a plurality of the zones to be overlapped. In such cases, the control unit will merge both of the zones into one zone and will register the merged zone. The control unit will execute such merging control under a condition that the distance between both of the zones is equal to or shorter than a specific distance, or that the difference of moving speeds between both of the zones is equal to or lower than a specific speed. Thus, the number of zones can be flexibly controlled depending upon the traffic of the mobile terminals on the road.

The control unit may also divide one zone into a plurality of zones, when the traffic congestion is resolved, when a zone with a higher moving speed passes a zone with a lower moving speed, or when a variation arises in the traffic distribution of mobile terminals. The control unit will execute such dividing control under a condition that the distance between the mobile terminals in this zone is longer than a specific distance, or the number of mobile terminals registered in this zone will exceed a limited number.

Furthermore, the control unit performs handover for a mobile terminal when this mobile terminal belonged to a first zone moves at higher speed than that of this first zone and enters into a second zone. If the moving speed of the first zone is 80 km/h and that of the mobile terminal in the first zone is 100 km/h, this mobile terminal will move at a relative moving speed of 20 km/h in the first zone. This handover control is the same as that of handover of a mobile terminal moving at 20 km/h within a cell to another cell in the conventional cellular phone system or the conventional cordless telephones system. Therefore, the conventional cellular phone can easily perform this control or cordless telephones system.

According to the present invention, in an environment in which mobile terminals move in a fixed direction substantially, for example in a road on which vehicles are running, even if the number of mobile terminals increases, the number of switching times in the exchanging unit does not increase. Also, according to the present invention, since handover does not occur frequently even if a mobile terminal moves at high-speed in a small cell, the handover control becomes easy.

Furthermore, according to the present invention, since movable beam antennas or fixed beam antennas with beam patterns are adequately used, it is enabled to move a zone smoothly. Moreover, the number of mobile terminals accommodated in one beam can be properly controlled. In addition, since two or more zones are assigned to an optional area in the road, failure of catching a vehicle by the beam pattern can be prevented when the beam patterns are switched.

According to the present invention, each zone can be comparatively easily controlled by cyclically moving the zones on the road. Moreover, the congestion status in one zone is also avoidable by controlling the size of the zone.

Furthermore, since a mobile terminal entered into the inlet of the road is registered to a zone, no unnecessary zone is generated. Thus, any useless beam is not emitted from the antenna causing interference waves to reduce from occurring.

Also, according to the present invention, a suitable zone can be always assigned to each of mobile terminals with different speeds by merging the zones or by dividing the zone.

According to the present invention, in addition, a zone shift control becomes possible by providing a control unit to the conventional cellular phone or cordless telephone system and by matching cells with zones, respectively.

Many widely different embodiments of the present invention may be constructed without departing from the spirit and scope of the present invention. It should be understood that the present invention is not limited to the specific embodiments described in the specification, except as defined in the appended claims.

What is claimed is:

1. A mobile communication system comprising:
a plurality of antennas for sending and receiving beams;
a plurality of mobile terminals moving in a fixed direction substantially; and
a zone-shift control means for treating the moving mobile terminals locating within a predetermined area as a single moving zone and for controlling said antennas and directions of said beams so that said beams always cover said moving zone;
wherein said zone-shift control means includes means for covering said zone by using a plurality of beam patterns containing beam patterns of neighboring antennas and for switching said beam patterns so that all zones move in said fixed direction simultaneously, each of said beam patterns for each antenna being formed by combining a plurality of beams.

2. A system as claimed in claim 1, wherein said zone-shift control means includes means for cyclically assigning said zone moved to an outlet of an environment to an inlet of the environment.

3. A system as claimed in claim 1, wherein said zone-shift control means includes means for registering said mobile terminal newly entered at an inlet of an environment with an already existing zone or with a newly generated zone depending upon predetermined conditions.

4. A system as claimed in claim 3, wherein said predetermined conditions are that the mobile terminal locates within a coverage area of said already existing zone or that the mobile terminal locates at a position separated from said already existing zone by a fixed distance or less, and that the number of mobile terminals registered in said already existing zone does not exceed a limited number, and wherein said zone-shift control means includes means for registering said mobile terminal with said already existing zone if said predetermined conditions are satisfied.

5. A system as claimed in claim 1, wherein said zone-shift control means includes means for merging two zones into one zone and for registering the merged zone depending upon first predetermined conditions when one of said two zones approaches the other zone.

6. A system as claimed in claim 5, wherein said first predetermined conditions are that a distance between said two zones is equal to or shorter than a predetermined distance and that a difference between the moving speeds of said two zones is equal to or lower than a predetermined speed, and wherein said zone-shift control means includes means for merging said two zones into one zone and for registering the merged zone if said first predetermined conditions are satisfied.

7. A system as claimed in claim 5, wherein said zone-shift control means includes means for dividing one zone into a plurality of zones depending upon second predetermined conditions.

8. A system as claimed in claim 7, wherein said second predetermined conditions are that a distance between said mobile terminals is equal to or longer than a specific distance or that the number of mobile terminals registered in said one zone will exceed a limited number, and wherein said zone-shift control means includes means for dividing said one zone into a plurality of zones if said second predetermined conditions are satisfied.

9. A system as claimed in claim 1, wherein said zone-shift control means includes means for performing handover for a mobile terminal when said mobile terminal belonged to a first zone moves at higher speed than that of said first zone and enters into a second zone.

* * * * *